United States Patent
Evans et al.

(10) Patent No.: US 7,367,594 B2
(45) Date of Patent: May 6, 2008

(54) HOSE COUPLING DEVICE

(75) Inventors: Daniel C. Evans, Eugene, OR (US); N. John Leuck, Eugene, OR (US); Douglas C. Lewis, Brookings, OR (US); Daniel J. Lyman, Eugene, OR (US)

(73) Assignee: QL Holdings, LLC, Eugene, OR (US)

( * ) Notice: Subject to any disclaimer, the term of this patent is extended or adjusted under 35 U.S.C. 154(b) by 43 days.

(21) Appl. No.: 11/158,114

(22) Filed: Jun. 21, 2005

(65) Prior Publication Data

US 2005/0242578 A1 Nov. 3, 2005

Related U.S. Application Data

(63) Continuation of application No. 10/683,140, filed on Oct. 9, 2003, now abandoned.

(51) Int. Cl.
*F16L 33/00* (2006.01)

(52) U.S. Cl. ..................... 285/247; 285/255

(58) Field of Classification Search .............. 285/246, 285/255, 245, 247
See application file for complete search history.

(56) References Cited

U.S. PATENT DOCUMENTS

| | | | | | |
|---|---|---|---|---|---|
| 2,974,980 | A | * | 3/1961 | Boyle | 285/247 |
| 3,246,921 | A | * | 4/1966 | Lyon et al. | 285/247 |
| 4,278,279 | A | * | 7/1981 | Zimmerman | 285/255 |
| 4,736,969 | A | * | 4/1988 | Fouts | 285/247 |
| 6,017,066 | A | * | 1/2000 | Giuffre' | 285/38 |
| 7,014,216 | B2 | * | 3/2006 | Mittersteiner et al. | 285/247 |

\* cited by examiner

*Primary Examiner*—David Bochna
(74) *Attorney, Agent, or Firm*—Kolisch Hartwell, P.C.

(57) ABSTRACT

Hose coupling devices that securely connect an end of a hose to a fitting member using a retention mechanism operated by multi-threaded engagement of the fitting member with a collar member. The multi-threaded engagement also may operate a hose advancement mechanism. The advancement mechanism axially advances a hose during multi-threaded engagement so that the hose may be more effectively gripped by the retention mechanism.

13 Claims, 3 Drawing Sheets

HOSE COUPLING DEVICE

CROSS-REFERENCE TO RELATED APPLICATIONS

This is a continuation application of U.S. patent application Ser. No. 10/683,140 filed Oct. 9, 2003, now abandoned titled "Hose Coupling Device" which claims priority under 35 U.S.C. § 120 to PCT Application No. PCT/US02/11176 filed Apr. 9, 2002 titled "Hose Coupling Device," which in turn claims priority under 35 U.S.C. § 119(e) to U.S. Provisional Patent Application Ser. No. 60/282,763 filed Apr. 9, 2001. Each of these applications is incorporated herein by reference in its entirety.

This application incorporates herein by reference in its entirety for all purposes PCT Application No. PCT/US00/33404, filed Dec. 7, 2000.

FIELD OF THE INVENTION

The invention involves conduit coupling devices. In particular, the invention relates to conduit coupling devices that securely connect an end of a hose to a fluid conduit member to create a sealed conduit connection.

BACKGROUND

Hose coupling devices may be used for many purposes. For example, coupling devices may be used to connect two hoses of the same or different sizes, or coupling devices may be used to connect a hose to a fixture such as a tank or a vessel. Coupling devices also may be used to split one conduit into two or more channels, or to redirect the conduit in a new direction, for example, around a corner. Furthermore, coupling devices may be used to connect a hose to a valve or a nozzle, or to connect plural hoses to a multi-port manifold.

Many types of coupling devices, or couplers, have been used in the past. For example, coupling devices are disclosed in U.S. Pat. No. 1,288,148, issued Dec. 17, 1918; U.S. Pat. No. 2,853,320, issued Sep. 23, 1958; U.S. Pat. No. 4,437,689, issued Mar. 20, 1984; and U.S. Pat. No. 4,951,976, issued Aug. 28, 1990, the disclosures of which are incorporated herein by reference. There are problems with these and other prior art couplers that may limit their use for certain applications. In some cases, couplers are designed for, and function best with, specific types of hoses/tubing. For example, these couplers may be designed for use with tubing that has a metal sheath, with tubing that is multi-layered, or with tubing that can be easily cut by the coupler. In addition, many of these couplers use a single-threaded engagement mechanism that is cumbersome to implement.

Single-threaded engagement mechanisms operate through rotational engagement between a single helical thread and groove on each of two coupler components. To allow the single-threaded mechanism to engage effectively, one or both components of the coupler generally must be rotated through many revolutions. These revolutions may require patience and may be an ineffective approach for rapidly coupling (and uncoupling) many hoses in a short time period. Furthermore, for these single-threaded mechanisms to work effectively, the single thread of one component and the complementary groove of the other need to be precisely aligned before being rotationally engaged. Accordingly, only one rotational alignment of the coupler components allows the coupler to be effectively engaged. Under time pressure, this alignment may not be achieved properly, resulting in ineffective coupling, and potentially, a damaged or ruined thread. However, even if proper rotational engagement is achieved, many of these prior art couplers do not grip a hose effectively enough to handle a high side-load pressure without leaking. Therefore, new conduit coupling devices are needed that quickly and effectively secure hoses to the devices.

SUMMARY OF THE INVENTION

The invention provides hose coupling devices that securely connect an end of a hose to a fitting member to create a sealed conduit connection, using a retention mechanism operated by multi-threaded engagement of the fitting member with a collar member. The multi-threaded engagement also may operate a hose advancement mechanism. The advancement mechanism axially advances a hose during multi-threaded engagement so that the hose may be more effectively gripped by the retention mechanism.

DETAILED DESCRIPTION

The invention provides hose coupling devices that securely connect an end of a hose to a fitting member using a retention mechanism driven by multi-threaded engagement of the fitting member with a collar member. Multi-threaded engagement operates through plural threads on the fitting member and/or the collar member. These plural threads may allow each of the plural threads to advance at a greater pitch, thus producing a greater linear (axial) advancement of the collar member toward the fitting member per turn of the collar member. Accordingly, the fitting and collar members may operate/activate the retention mechanism to secure and sealingly retain a hose to the coupling device with less than a full turn of the collar member. In addition, the plural threads may allow the collar member to initiate engagement at a corresponding plural rotational positions around the perimeter of the fitting member, making engagement faster and easier still.

The retention mechanism may use the fitting and collar members to grip an end of a hose between a first retaining portion, such as a tube portion, on the fitting member and a second retaining portion on the collar member. The tube portion may insert into the hose end to contact an interior surface of the hose end. By contrast, the second retaining portion may at least substantially encircle the hose end, causing the second retaining portion to advance and surround the tube portion so that the second retaining portion and tube portion opposingly grip and thus retain the hose end to form a sealed conduit connection.

The multi-threaded engagement mechanism also may be coupled to or drive a hose advancement mechanism. The advancement mechanism axially advances and generally compresses a hose during multi-threaded engagement so that the hose may be more effectively gripped by the retention mechanism. For example, the second retaining portion may include a hose-advancing structure that pulls the hose onto the tube portion as the collar advances onto the fitting member during engagement. The hose-advancing structure may be a ridged or a threaded region, such as a multi-threaded region. When threaded, the hose-advancing region may have a pitch that is less than, or opposite in polarity to, the pitch of an engaging portion of the collar member. Based on these differences in pitch, engagement of the fitting member with the collar member may advance the hose less than, the same amount as, or more than the axial (linear) distance advanced by the collar member onto the fitting member. Engagement-coupled hose advancement may be used to produce a more secure and leak-resistant seal between the hose and coupling device. Therefore, the invention may provide a hose coupling device that more effectively secures and seals a hose to the coupling device at a greater speed and with less effort.

Figure 1:
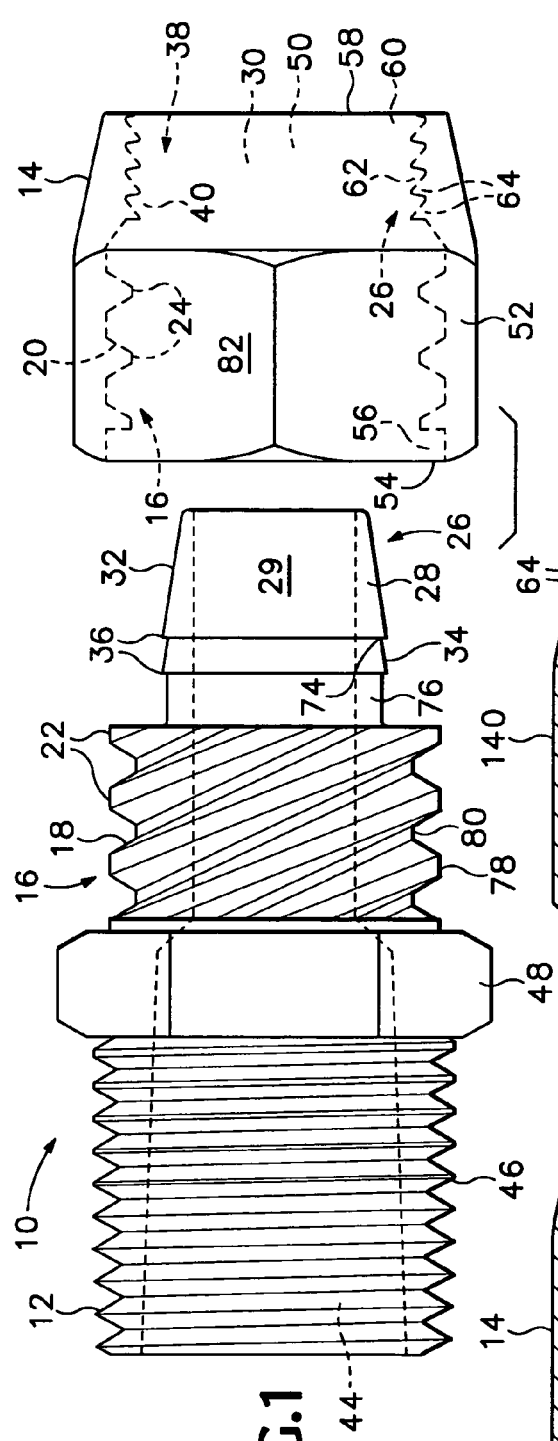
FIG. 1 is an exploded view of a hose coupling device, showing a fitting member and a collar member, in accordance with aspects of the invention.

FIG. 1 shows an embodiment of a hose coupling device 10, constructed in accordance with aspects of the invention. Coupling device 10 may include at least two components, a fitting member 12 and a collar member 14. Here, the fitting and collar members are depicted in a separated but axially aligned configuration, with selected portions of the interior structure of the fitting and collar members shown in dotted outline. The fitting and collar members 12, 14 may cooperate to provide at least three mechanisms, as described below.

A multi-threaded engagement mechanism 16 engages fitting member 12 with collar member 14. Multi-threaded engagement mechanism 16 may be provided by rotationally engaging structures, such as male engaging portion 18 on an external side of fitting member 12 and a complementary female engaging portion 20 on an internal side of collar member 14. In alternative embodiments, male engaging portion may be provided by collar member 14, and female engaging portion may be provided by fitting member 12. Furthermore, as described in more detail below, one or both of these engaging portions are multi-threaded portions, for example, each having four threads 22, 24 in coupling device 10.

Engagement mechanism 16 generally comprises any rotationally implemented mechanism that operates through a multi-threaded portion on either fitting member 12, collar member 14, or both members. Coupling device 10 includes a multi-threaded portion on each member, with the two multi-threaded portions being complementary to each other. However, in some embodiments, only a first of these two members may have a multi-threaded portion whereas the second may have only a partially complementary structure, such as a short axial segment or other fractional region of a multi-threaded portion. For example, the second member may have a set of radially disposed protrusions that are received and guided by a correspondingly disposed set of helical grooves provided by the threaded portion of the first member. In such a case, the set of protrusions behave as short threads.

Multi-threaded portions (or regions) generally comprise any threaded structure that has two or more cooperatively acting threads following distinct helical/spiral paths, at the same axial position(s). Cooperatively acting means that the threads can be simultaneously engaged by a complementary threaded portion. A thread generally includes any ridge(s) on a male of female structure that follows a helical path around a helical axis, termed a thread axis. The ridge may be a single continuous ridge or a set of two or more axially spaced ridges that follow different portions of a common helical path. The two or more threads of a multi-threaded portion may be radially disposed at a given axial position, in a symmetrical or asymmetrical fashion, and generally share a common thread axis or helical axis. Axial position refers throughout to position along an axis parallel to the thread axis or helical axis of a threaded or engaging portion. The multi-threaded portion may include two, three, four, up to eight, ten, or more threads, and generally includes a corresponding number of channels or grooves extending adjacent to the threads. Each of the plural ridges and each of the plural grooves may be similar or dissimilar in size and/or shape. However, the plural ridges generally extend in a side-by-side relationship and are nonintersecting. Furthermore, the multi-threaded portion may have a set of threads that are standard threads or reverse threads. Standard and reverse threads differ in helical handedness and have helical angles with opposite polarity (see below). Standard threads have a pattern that follows a right-handed helical path, whereas reverse threads have a pattern that follows a left-handed helical path.

Each thread has a pitch. The pitch is defined as the linear/axial travel, parallel to the thread axis, resulting from a complete revolution around the thread's axis, following the thread's path. Pitch (P) is related both to the radius (r) of the helical path, and to the helical angle (θ) of a thread, which is defined as the angle formed by intersection of the thread with a plane perpendicular to the thread axis. The pitch of a thread may be calculated by the formula:

$$P=2\pi r \tan(\theta)$$

Accordingly, increasing the helical angle of a thread, without changing its radius, will increase the pitch. Pitch is independent of the number of threads in a threaded portion, although a greater number of threads may allow the threads to have a greater helical angle and thus a greater pitch without sacrificing the ability to engage effectively. Accordingly, multi-threaded portions may be used to minimize the number of rotations necessary to achieve a desired axial movement and/or to achieve the same helical pitch with finer threads. The finer threads may engage/grip more effectively than coarser threads. Multi-threaded portions of the fitting member or collar member may have larger helical angles than single-threaded portions, with angles greater than about 10°, 15°, or 20°.

Gripping or retention mechanism 26 sealingly associates hose with, and secures the hose to, coupling device 10 in a leak-resistant manner, in response to implementation of engagement mechanism 16. Retention mechanism 26 may be formed by two retaining portions 28, 30. Retaining portion 28 of the fitting member may be an insertion member, for example, tube portion 29 of fitting member 12, that facilitates retention by contact with an interior region of an end of a hose. To facilitate insertion and retention, tube portion 29 may have a beveled end region 32 and an angled, stepped exterior 34. End region 32 and stepped exterior 34 may facilitate pushing the end of a hose onto the tube portion, but may resist removal of the hose through the action of asymmetrical ridges 36. By contrast, retaining portion 30 of collar member 14 may be dimensioned to generally encircle and contact an exterior segment of the hose end. Accordingly, retaining portion 30 may be positioned, by the action of engagement mechanism 16, to generally surround tube portion 29 so that the hose end is opposingly gripped by the fitting member and collar member retaining portions, 28 and 30, respectively.

The effectiveness of retention mechanism 26 may be enhanced by advancement mechanism 38. Advancement mechanism 38 may be engagement driven, that is, activated by implementation of the engagement mechanism and may operate before and/or during operation of retention mechanism 26. Advancement mechanism 38 may use a hose-advancing structure 40 on retaining portion 30 to limit slippage of a hose relative to the retaining portion, as described more fully below.

FIG. 1 shows additional aspects of fitting member 12. Internal channel 44, indicated by dotted lines, extends through fitting member 12, to provide fluidic communication between a coupled hose and any desired structure, such as a fixture, receptacle, conduit, etc., included in, or attached to the fitting member. In coupling device 10, such a desired structure may be attached to the fitting member using connecting portion 46. Here, connecting portion 46 is a single-threaded structure. However, as exemplified below, connecting portion 46 may have any suitable single-, multi-, or non-threaded structure, and may perform any desired function. Fitting member 12 also may include a gripping structure 48, adapted either for gripping with a tool, such as a wrench or pliers, or for gripping with the hand of a user. Here, gripping structure 48 has a hexagonal profile (not shown).

FIG. 1 also shows additional aspects of collar member 14. Collar member has an axial channel 50, which may be formed by adjoining or adjacent female engaging portion 20 and retaining portion 30. Axial channel 50 may receive male engaging portion 18 and tube portion 29. Collar member 14 also may have a gripping region, such as hexagonal region 52, to assist in rotationally engaging the collar member with fitting member 12, as described above for gripping structure 48 of the fitting member.

Figure 2:
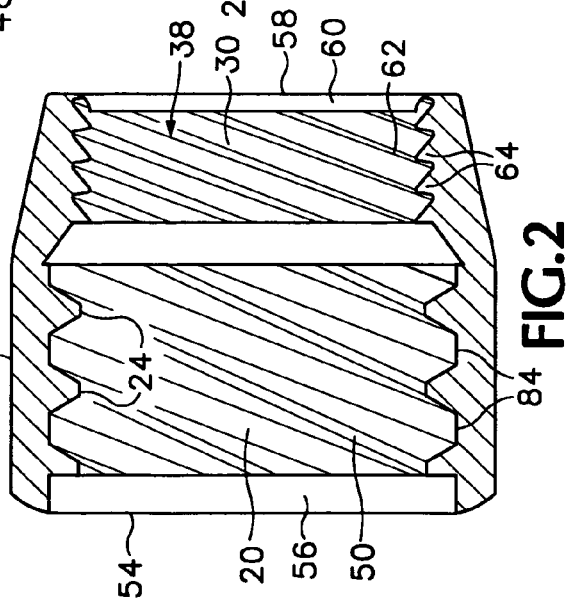
FIG. 2 is a sectional view of the collar member of FIG. 1, in accordance with aspects of the invention.

FIG. 2 shows interior aspects of collar member 14. Proximal end region 54 of the collar member may include an alignment structure 56 that facilitates proper threading of engagement mechanism 16. Here, alignment structure 56 is an annular recess that guides male engaging portion 18 into proper abutment and axial alignment with female engaging portion 20 prior to engagement (see FIG. 5). Distal end region 58 also may include a structure that facilitates coupling, widened section 60. Widened section 60 may act to receive and guide a hose end into axial channel 50. Widened section 60 may be formed, for example, by rounding or beveling the inner perimeter of distal end region 58.

FIG. 2 shows female engaging portion 20 in more detail. In coupling device 10, female engaging portion has a set of four threads 24, extending along four distinct, axially displaced, helical paths. Female engaging portion 20 is complementary to male engaging portion 18 of fitting member 12, with threads 22, 24 extending with the same helical handedness. However, FIG. 2 shows a back segment of female engaging portion 20, whereas FIG. 1 shows a front segment of male engaging portion 18, so the threads may appear to have distinct helical handedness, potentially confusing a viewer.

Retaining portion 30 may be disposed adjacent female engaging portion 20 in collar member 14. Retaining portion 30 also may have a multi-threaded structure, shown as threaded region 62 with a plurality of hose-advancing threads 64, in this case eight, to form hose-advancing structure 40 (and advancement mechanism 38). Alternatively, threaded region 62 may be single-threaded, or may not be threaded at all. For example, hose-advancing structure 40 may include one or more hose-advancing ridges that are generally circular, not helical, for example, as in tube portion 29. In general, hose-advancing threads/ridges may have an asymmetrical profile to restrict hose movement/slippage toward distal end region 58, but may allow hose movement toward proximal end region 54.

Figure 3:
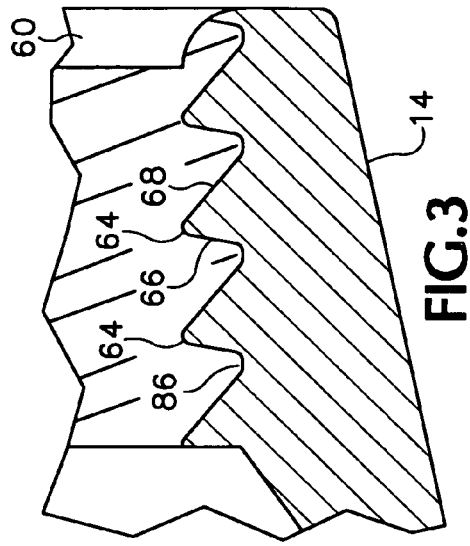
FIG. 3 is a fragmentary, enlarged view of selected portions of the view of FIG. 2, in accordance with aspects of the invention.

FIG. 3 shows the asymmetrical profile of hose-advancing threads 64 in more detail. These threads with asymmetrical profiles, referred to as buttress threads, have flanks 66, 68 that slope at unequal angles relative to perpendicular the thread axis, with flanks facing toward engaging portion 20 having a smaller angle than those facing away. For example, retaining flank 66 has a small thread profile, being almost perpendicular to the long axis of collar member 14. In contrast, permissive flank 68 has a substantially larger thread profile, forming a larger angle relative to perpendicular. Accordingly, retaining flank may restrict uncoupling movement of a hose toward distal end region 58. In contrast, permissive flank 68 may allow collar member 14 to slide onto a hose, for example, prior to coupling. Thread profile angles for retaining flanks 66 may be about 0° to 25°, 2° to 15°, or 4° to 10°, whereas thread profile angles for permissive flanks 68 may be about 35° to 70°, 40° to 65°, or 45° to 60°. Alternatively, threads/ridges 64 may have a generally symmetrical profile that may restrict or prevent hose movement relatively equally in either axial direction relative to engaging portion 20.

Figure 4:
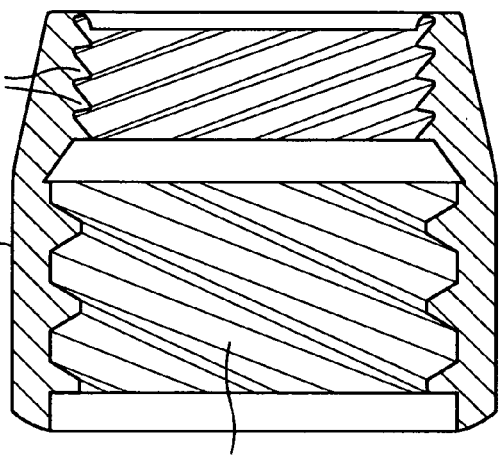
FIG. 4 is a sectional view of an alternative embodiment of a collar member, in accordance with aspects of the invention.

Female engaging portion 20 and retaining portion 30 may have any suitable pitch relative to each other. For example, FIG. 2 shows engaging portion 20 with a greater pitch than retaining portion 30. This greater pitch causes the distance of linear (axial) travel of collar member 14 onto fitting member 12, during engagement, to be greater than the distance traveled by collar member 14 relative to a hose. The difference in these distances may correspond to the distance with which the hose is pulled toward the fitting member, and generally onto tube portion 29, during engagement. By changing the relative pitches of engaging portion 20 and retaining portion 30, any suitable ratio of distances of axial travel may be achieved. For example, FIG. 4 shows an alternative embodiment of collar member 14. In collar member 140, hose-advancing threads 64 travel with a distinct helical handedness relative to engaging portion 20, and thus have a pitch of opposite polarity. Accordingly, the distance of axial travel of collar member 140 during engagement should be less than the distance of axial travel of a hose (each relative to the fitting member). In other embodiments, retaining portion 30 may have a pitch that is equal to that of the engaging portion, to achieve no travel of the hose, or a fractional pitch that is about 0.1 to 0.95 times the pitch of the engaging portion to achieve a fractional axial travel of 0.9 to 0.05, respectively, for the hose relative to the collar member.

In particular embodiments, the fractional pitch may be about one-half, two-thirds, three-fourths, four-fifths, and nine-tenths, to give respective travel ratios (collar member:hose) of 2:1, 4:1, 5:1, and 10:1. The same distance of travel of the collar member and hose (ratio of 1:1) may be achieved with nonhelical ridges in the retaining portion, as described above.

Figure 5:
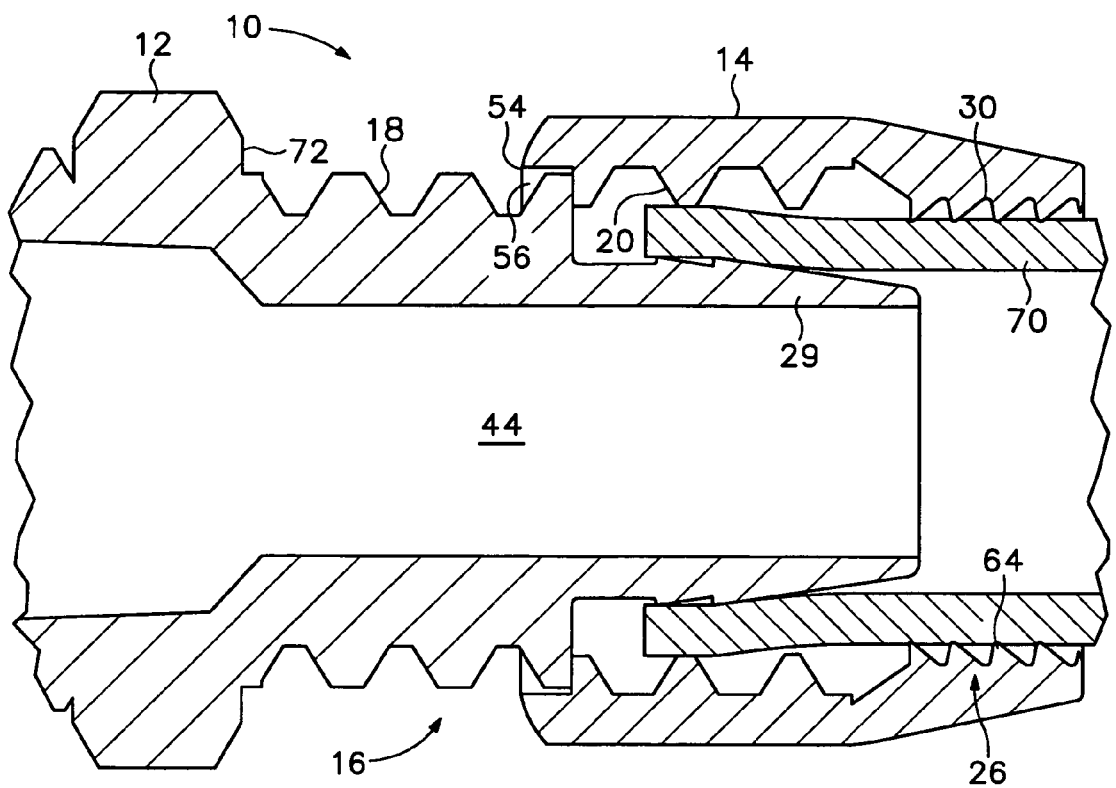
FIG. 5 is fragmentary sectional view of selected portions of the hose coupling device of FIG. 1 in association with a hose, showing the hose coupling device readied to secure the hose to the device, in accordance with aspects of the invention.
Figure 6:
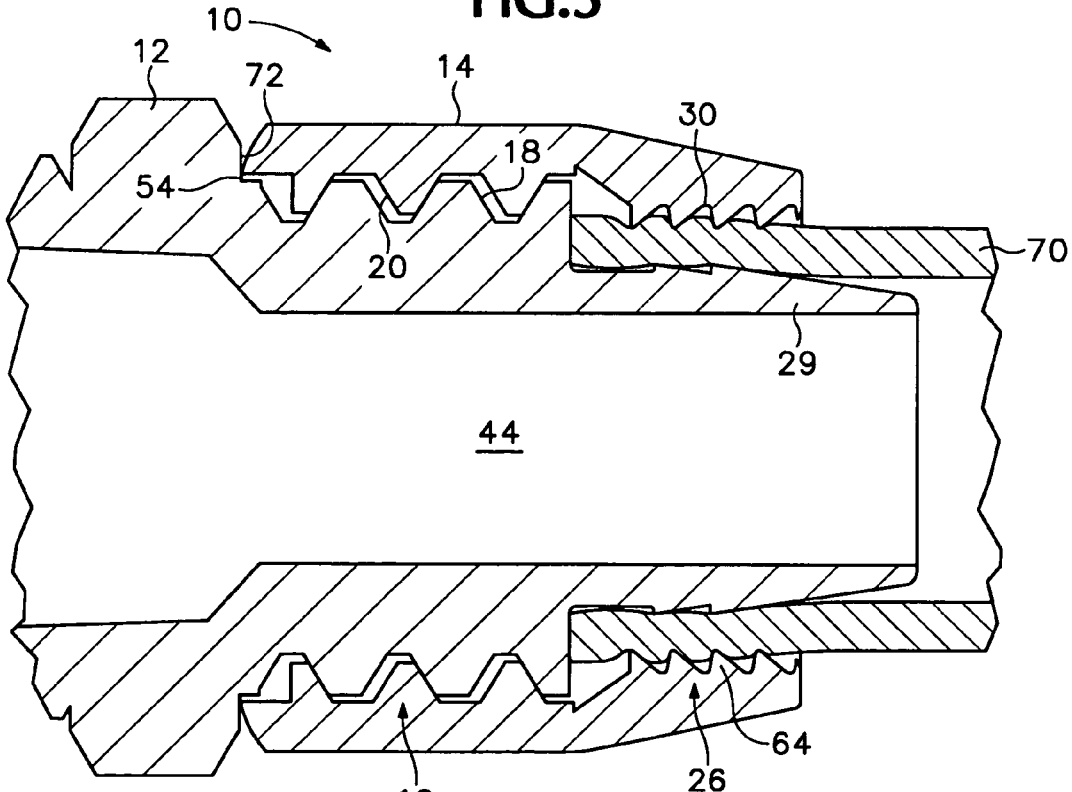
FIG. 6 is a view of the hose coupling device and hose of FIG. 5, showing the hose coupling device fully engaged and securing the hose to the device after hose advancement, in accordance with aspects of the invention.

FIGS. 5 and 6 show hose coupling device 10 being used to secure a hose 70 to the device. In FIG. 5, hose 70 has been inserted through collar member 14 and pushed most of the way onto tube portion 29. Alternatively, hose 70 may be pushed a smaller or greater fraction of the way onto tube portion 29, including completely onto the tube portion, at this point prior to engagement. Collar member 14 has been brought into abutment with fitting member 12, so that alignment structure 56 acts to axially align the fitting and collar members. To achieve this abutment, collar member 14 may be advanced along hose 70, toward fitting member 12, by rotating the collar member. In FIG. 6, engagement mechanism 16 has been fully implemented. Collar member 14 has been rotated and thus advanced until proximal end portion 54 contacts a shoulder 72 of fitting member 12. Hose 70 has advanced farther onto tube portion 29 and has been compressed axially. Axial compression may be more pronounced if hose 70 is pushed fully onto tube portion 29 prior to engagement, so that a distal portion of the hose advances more than a proximal portion closest engaging portion 18. In either case, more distal portions of hose 70 advance relative to fitting member 12. In addition, retaining portion 30 has been advanced to surround tube portion 29, so that the end of hose 70 is opposingly gripped by tube portion 29 and retaining portion 30. As shown, hose-advancement threads 64 may bite into or deform hose 70 to facilitate advancement and retention.

A specific embodiment of hose coupling device 10 is described below as an example. This example is included for illustration and is not intended to limit or define the scope of the invention. The specific embodiment is molded from a hard plastic, polysulfone. However, in other embodiments the hose coupling device may be constructed of any other suitable plastic, metal, and/or elastomer, among others. The specific embodiment described below is dimensioned to accept a hose made of cross-linked polyethylene, having an internal diameter of 0.50 inches and a hose wall thickness of 0.0625 inches.

In this specific embodiment, fitting member 12 has the following dimensions. Tube portion 29 is 0.5120 inches in length. Internal channel 44 within the tube portion has a diameter of 0.370 inches, and the outer diameter of the distal tip of the beveled end portion is 0.4340 inches, with a radius of 0.0200 inches at the outer distal perimeter. Ridges 36 have a diameter of 0.5210 inches and are spaced by 0.0830 inches from each other and by 0.1250 inches from male engaging portion 18 (for the more proximal of the two ridges). Root/groove 74 adjacent the more distal of the two ridges 36 has a diameter of 0.495 inches. Shank portion 76 has a diameter of 0.50 inches. Male engaging portion 18 has a length of 0.4850 inches and has a pitch of 0.625 inches (linear advancement per revolution), with the four threads positioned in a radially symmetrical arrangement, equidistant from the thread (helical) axis. Each thread crest 78 has a width of 0.0447 inches and each thread root 80 (flattened portion at the base of the groove) has a width of 0.0290 inches. Here, threads 22 have flattened crests to minimize damage to the threads. However, in other embodiments, the crests may form sharp ridges.

Collar member 14 has the following dimensions in this specific embodiment. The axial length of collar member 14 is 0.8250 inches. Hexagonal region 52 has a width of 0.9375 inches for spacing between parallel pairs of surfaces 82 and an axial length of 0.5000 inches. Female engaging portion 20 has a length of 0.490 inches and alignment structure 56 has a depth of 0.0400 inches (measured along the long axis of the collar member). Alignment structure 56 and engaging portion 20 both have a diameter and maximum diameter, respectively, of 0.7880 inches. Grooves 84 of engaging portion 20 (see FIG. 2) have a width of 0.056 inches and are 0.015 to 0.020 inches oversized relative to male engaging portion 18 of fitting member 12. Grooves 84 taper by 0.585° or 0.005 inches (decreased diameter) from proximal end region 54 to distal end region 58, adjacent retaining portion 30. Retaining portion 30 has an axial length of 0.2519 inches, and a minimum diameter of 0.632 inches (measured from thread to thread 64 across the thread axis). Threads 64 have a radius of 0.0050 inches at the peak of the threads (see FIG. 4). Adjacent grooves 86 have a width along a flattened central portion of 0.0043 inches, and radii of 0.0050 inches flanking the central portion. Retaining flanks 66 extends at an angle of about 6° and permitting flanks at an angle of about 50°, each measured relative to orthogonal the thread axis/long axis. The pitch of retaining portion 30 is 0.50 inches, and the eight threads 64 are spaced in a radially symmetrical fashion, equidistant from the thread axis. The relative pitches of fitting member and collar member engaging portions, 18, 20, are 0.625 inches and 0.50 inches, respectively, with a difference of 0.125 inches. Therefore, these pitches define a 5:1 ratio (0.625:0.125) of collar member to hose travel relative (each relative to the fitting member).

Figure 7:
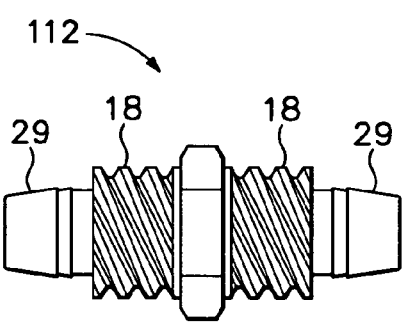
FIG. 7 is a view of an alternative embodiment of a fitting member, in accordance with aspects of the invention.
Figure 8:
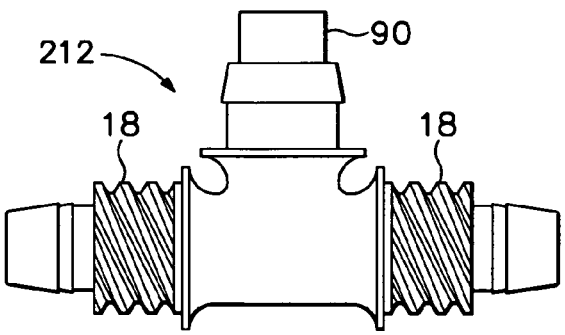
FIG. 8 is a view of another alternative embodiment of a fitting member, in accordance with aspects of the invention.
Figure 9:
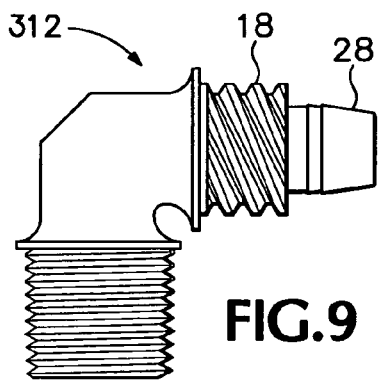
FIG. 9 is a view of yet another embodiment of a fitting member, in accordance with aspects of the invention.
Figure 10:
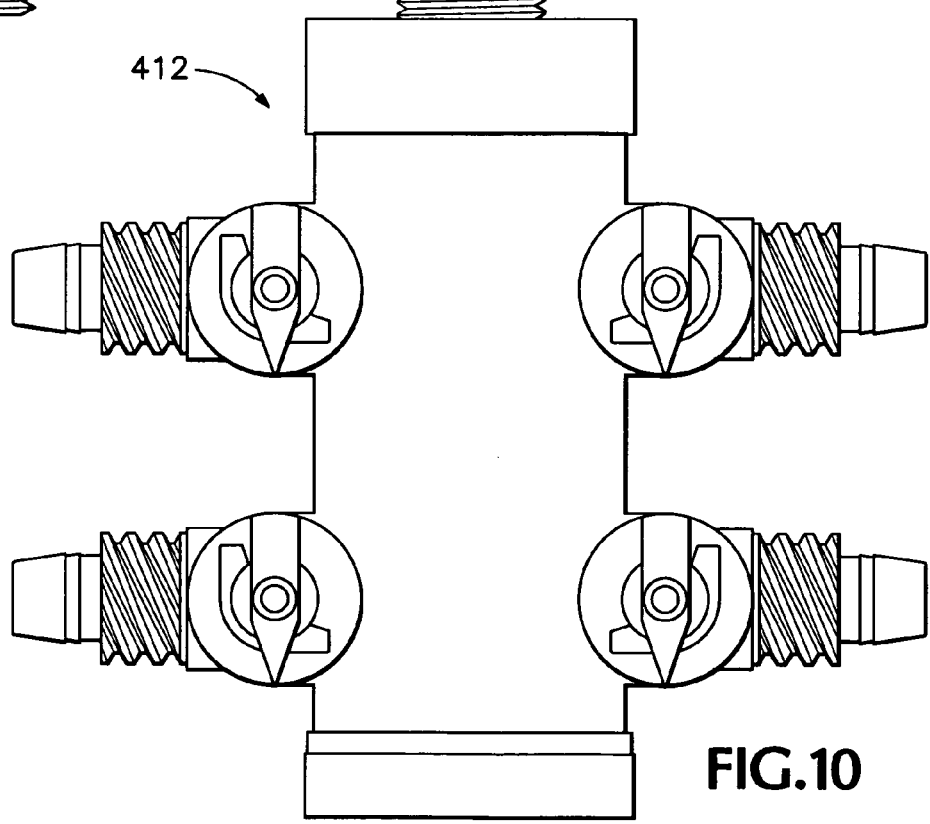
FIG. 10 is a view of a fitting member-manifold, in accordance with aspects of the invention.

FIGS. 7-10 show alternative embodiments of fitting member 12. In FIG. 7, fitting member 112 includes two engaging portions 18 and two tube portions 29. Accordingly, fitting member 112 may act as a linear connector between two hoses. In FIG. 8, fitting member 212 acts as a T-connector, having two engaging portions and a connecting portion 90. In other embodiments, fitting member 212 may have any angular relationships between each of the engaging/connecting portions, and may have any suitable number of such connecting portions. In FIG. 9, fitting member 312, referred to as any elbow fitting, is similar to fitting member 12, but forms an angled junction between two conduits or fixtures. In FIG. 10, fitting member 412 is, or is included in, a fitting member-manifold that may independently regulate output to plural conduits from a single input. Such a manifold that is configured to have multiple connected output conduits may benefit significantly from the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

We claim:

1. A hose coupling device comprising
a fitting member having an internal channel, a first multi-threaded portion including a plurality of ridges extending along a plurality of distinct helices, and a tube portion configured for insertion into an end of a hose, and
a collar member having a second multi-threaded portion that complements the first multi-threaded portion for engaging the fitting member to the collar member and creating a sealed conduit connection between a hose and the internal channel of the fitting member, the first multi-threaded portion being formed on an external side of the fitting member, and the second multi-threaded portion is formed on an internal side of the collar member, wherein the collar member has a third multi-threaded portion that advances the hose along the tube portion when the collar member engages the fitting member, the third multi-threaded portion including buttress threads, wherein the first and second multi-threaded portions are configured such that the fitting member and the collar member can be completely engaged by turning the collar member less than about one revolution relative to the fitting member.

2. A hose coupling device comprising
a fitting member having an internal channel, a first multi-threaded portion including a plurality of ridges extending alone a plurality of distinct helices, and a tube portion configured for insertion into an end of a hose,
a collar member having a second multi-threaded portion that complements the first multi-threaded portion for engaging the fitting member to the collar member and creating a sealed conduit connection between a hose and the internal channel of the fitting member, each of the first and second multi-threaded portions being configured such that the collar member can be completely engaged to the fitting member by turning the collar member less than about one revolution relative to the fitting member, and
wherein the first multi-threaded portion includes at least four helical threads that follow adjacent helical paths.

3. A hose coupling device comprising
a fitting member having an internal channel, a first multi-threaded portion including a plurality of ridges extending along a plurality of distinct helices, and a tube portion configured for insertion into an end of a hose,
a collar member having a second multi-threaded portion that complements the first multi-threaded portion for engaging the fitting member to the collar member and creating a sealed conduit connection between a hose and the internal channel of the fitting member, each of the first and second multi-threaded portions being configured such that the collar member can be completely engaged to the fitting member by turning the collar member less than about one revolution relative to the fitting member, and
wherein the first multi-threaded portion includes plural threads that begin at substantially the same axial position along the fitting member.

4. A hose coupling device comprising
a fitting member having an internal channel, a first multi-threaded portion including a plurality of ridges extending along a plurality of distinct helices, and a tube portion configured for insertion into an end of a hose.
a collar member having a second multi-threaded portion that complements the first multi-threaded portion for engaging the fitting member to the collar member and creating a sealed conduit connection between a hose and the internal channel of the fitting member, each of the first and second multi-threaded portions being configured such that the collar member can be completely engaged to the fitting member by turning the collar member less than about one revolution relative to the fitting member,
wherein the collar member has a third multi-threaded portion that advances a hose along the tube portion when the collar member engages the fitting member.

5. The device of claim 4, wherein the third multi-threaded portion has at least eight threads.

6. The device of claim 4, wherein the third multi-threaded portion includes buttress threads.

7. The device of claim 4, wherein the first and second multi-threaded portions have a greater pitch than the third multi-threaded portion.

8. A hose coupling device comprising
a fitting member having an internal channel, a first multi-threaded portion including a plurality of ridges extending along a plurality of distinct helices, and a tube portion configured for insertion into an end of a hose, and
a collar member having a second multi-threaded portion that complements the first multi-threaded portion for engaging the fitting member to the collar member and creating a sealed conduit connection between a hose and the internal channel of the fitting member, and a third multi-threaded portion that advances a hose along the tube portion when the collar member engages the fitting member.

9. The device of claim 8, wherein the first and second multi-threaded portions have a greater pitch than the third multi-threaded portion.

10. The device of claim 8, wherein the second and third multi-threaded portions include helical threads formed in an internal side of the collar member.

11. The device of claim 10, wherein each of the second and third multi-threaded portions includes threads, the threads of the second multi-threaded portion having a greater pitch than the threads of the third multi-threaded portion.

12. The device of claim 8, wherein the third multi-threaded portion includes buttress threads that resist removal of a hose from the tube portion of the fitting member.

13. The device of claim 8, wherein each of the second and third multi-threaded portions includes helical threads characterized by the same helical handedness.

* * * * *